(No Model.) 2 Sheets—Sheet 1.

E. JORDAN.
MACHINE FOR CUTTING AND SHAPING CRACKERS OR OTHER PLASTIC MATERIAL.

No. 475,280. Patented May 17, 1892.

ATTEST:
R. Ferguson
Noel Gale

INVENTOR:
Edmund Jordan
By Edwin H. Brown
His Attorney (No Model.) 2 Sheets—Sheet 2.

E. JORDAN.
MACHINE FOR CUTTING AND SHAPING CRACKERS OR OTHER PLASTIC MATERIAL.

No. 475,280. Patented May 17, 1892.

ATTEST:
C. R. Ferguson
Noel Gale

INVENTOR:
Edmund Jordan
By Edwin H. Brown
His Attorney

UNITED STATES PATENT OFFICE.

EDMUND JORDAN, OF BROOKLYN, ASSIGNOR, BY MESNE ASSIGNMENTS, TO THE PNEUMATIC PRESS COMPANY, OF NEW YORK, N. Y.

MACHINE FOR CUTTING AND SHAPING CRACKERS OR OTHER PLASTIC MATERIAL.

SPECIFICATION forming part of Letters Patent No. 475,280, dated May 17, 1892.

Application filed July 16, 1891. Serial No. 399,699. (No model.)

*To all whom it may concern:*

Be it known that I, EDMUND JORDAN, of Brooklyn, Kings county, and State of New York, have invented a certain new and useful Improvement in Machines for Cutting and Shaping Crackers and other Plastic Material, of which the following is a specification.

My improvement is specially applicable to a machine for making crackers and like articles, and I will illustrate and describe it in connection with such a machine.

Figure 1:
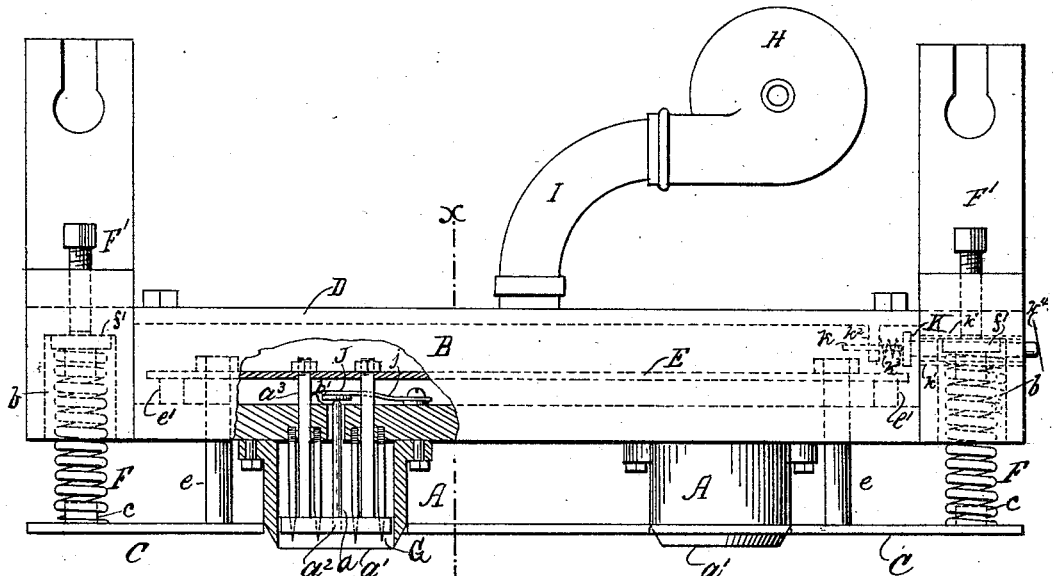
Figure 2:
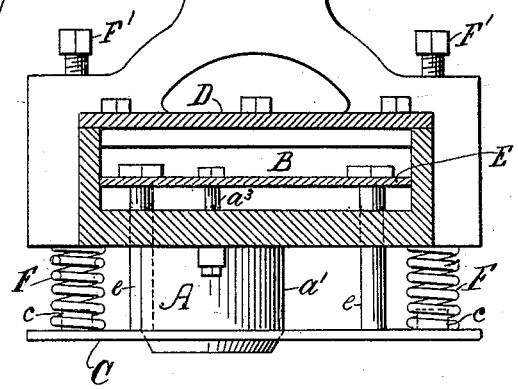
Figure 3:
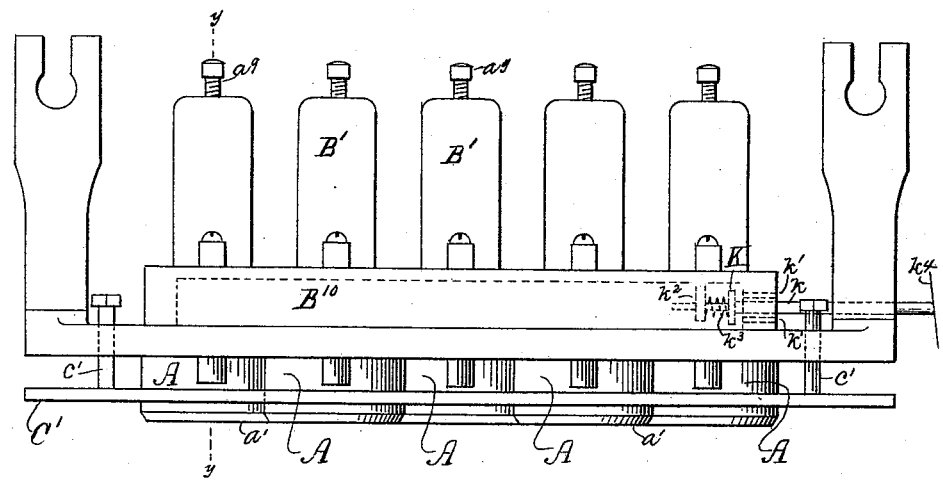
Figure 4:
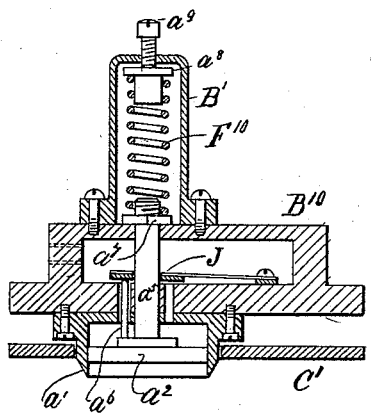

In the accompanying drawings, Figure 1 is a sectional front view of the upper part of a cracker-machine embodying my improvement. Fig. 2 is a vertical transverse section of the same, taken at the plane of the dotted line $x\ x$, Fig. 1. Fig. 3 is a front view of the upper part of a cracker-machine of somewhat modified construction embodying the improvement. Fig. 4 is a vertical transverse section of the latter, taken at the plane of the dotted line $y\ y$, Fig. 3.

Similar letters of reference designate corresponding parts in all the figures.

Referring first to Figs. 1 and 2, A designates cutters, shapers, or formers for shaping pieces of dough suitable for crackers and like articles. They are carried by a vertically-reciprocating cross-head B, which may be supported and moved in the manner in which such cross-heads are supported and moved in cracker-machines of ordinary construction or in any other suitable way.

C designates a stripper-plate carried by the reciprocating cross-head B and provided with a number of holes opposite the cutters, shapers, or formers A.

The cutters, shapers, or formers A may be of any suitable construction. As here shown, they severally consist of a circular knife-like section $a'$, which may be attached rigidly to the under side of the cross-head B, and a disk-like section $a^2$, commonly called a "clearer," which is combined with the section $a'$, so that the one section may have a vertical movement relatively to the other.

I provide the reciprocating cross-head B with a box or chamber. This may be done by making the upper portion of the cross-head hollow and fitting it with a cover D. Within the cross-head is arranged a plate E, which is free to move a short distance vertically therein. To this plate is secured by a rod or rods $a^3$ the section $a^2$ or clearer of each cutter, shaper, or former. Owing to this manner of supporting the section $a^2$ or clearer of each cutter, shaper, or former, provision is afforded for a relative movement between it and the section $a'$ of the same cutter, shaper, or former. The plate E is connected by rods $e$ with the stripper-plate C. Hence the stripper-plate and the sections $a^2$ or clearers of the cutters, shapers, or formers A will be connected together, so as to operate in unison.

Springs F tend to force the stripper-plate and the sections $a^2$ or clearers of the cutters, shapers, or formers A downward somewhat in advance of the cross-head B and the sections $a'$ of the cutters, shapers, or formers, and to hold them down for a short time after the cross-head and the sections $a'$ of the cutters, shapers, or formers begin their upward movement for the purpose of holding the dough down upon its supporting-surface during the rising of the sections $a'$ of the cutters, shapers or formers, which produce the desired outlines for the pieces of dough of which crackers are to be made. These springs as here shown are of helical form. At the lower ends they surround studs $c$, rising from the stripper-plate C, and at the upper ends extend into cavities $b$, provided within the end portions of the cross-head B. They do not, however, at their upper ends impinge against the tops of the cavities $b$, but bear against plates or abutments $f'$, attached to or arranged beneath screws F', that extend downwardly into the cavities through the cross-head. The object of employing these screws is to afford provision for varying the force with which the springs will act upon the stripper-plate and the sections $a^2$ or clearers of the cutters, shapers, or formers A.

The independent movements of the stripper-plate C and the sections $a^2$ or clearers of the cutters, shapers, or formers A is restricted by means of stops $e$, here shown as made in the form of pins, attached to the plate E and capable of contacting with the upper surface of the bottom of the cross-head. As usual, there may be combined with the sections $a^2$ or clearers of the cutters, shapers, or formers A, pins G, which extend from the cross-head B through holes in the sections $a^2$ or clearers of the cutters, shapers, or formers to punch the pieces of dough intended for crackers.

By my construction of the cross-head I make it capable of containing air or other gas, which may be admitted at proper times to the interior of the sections $a'$ of the cutters, shapers, or formers A. As here shown, I combine a rotary blower H with the cross-head B, establishing communication between these parts by a flexible rubber pipe I, that will not interfere with the vertical movements of the cross-head. This blower may be driven in the ordinary or any other suitable manner, and for it may be substituted any other means whereby air or other gas can be supplied to the cross-head.

With each cutter, shaper, or former will preferably be combined a valve, whereby the passage of air or other gas from the cross-head to the interior of each cutter, shaper, or former will be controlled. As here shown, I use a valve J of circular form, supported and arranged so as to be capable of covering or uncovering holes $b'$, extending through the bottom of the cross-head B. This valve is fastened to one end of a spring $j$, consisting of a strip of metal, which at the other end is fastened to the bottom of the cross-head and is of such resilience that whenever it can it will hold the valve away from its seat. The pressure of air or gas within the cross-head will force the valve to its seat and hold it there. When the valve is closed, it will of course cut off communication between the interior of the cross-head and the interior of the corresponding cutter, shaper, or former, and when it is raised from its seat communication will be established between these parts. The section $a^2$ or clearer of each cutter, shaper, or former is provided with a pin $a$, that extends up through the bottom of the cross-head and is capable of impinging upon the adjacent valve J. Normally the section $a^2$ or clearer of each cutter, shaper, or former will occupy such position relatively to the section $a'$ of such cutter, shaper, or former that its pin $a$ will not force the valve J from its seat against the pressure of air or other gas within the cross-head; but when during the downward movement of the cross-head the downward movement of the stripper-plate C and the section $a^2$ or clearer of each cutter, shaper, or former is arrested the continuance of the downward movement of the cross-head and of the section $a'$ of each cutter, shaper, or former to cut the dough will cause the pin $a$ to raise the adjacent valve J from its seat, whereupon air or other gas will be permitted to flow from the cross-head to the interior of each cutter, shaper, or former.

Of course provision for the escape of the air or other gas from each cutter, shaper, or former must be provided. It may escape through the space between the exterior of the section $a^2$ or clearer and the section $a'$ of each cutter, shaper, or former, or it may escape through the holes provided in the section $a^2$ or clearer of each cutter, shaper, or former for the passage of the pins G, or holes or passages may be separately provided for this purpose. The object of providing for the air or other gas is to enable it to detach the dough from the cutters, shapers, or formers, particularly from the sections $a^2$ or clearers of the cutters, shapers, or formers. When the cross-head rises sufficiently, the pins $a$ of each cutter, shaper, or former will release the corresponding valve J. The rods $a^3$ and $e$ pass through the cross-head, but it is intended that they shall fit so tightly as not to permit of any material leakage of air or other gas. Preferably I combine with the cross-head a relief-valve K, whereby air or other gas may be permitted to escape therefrom to reduce its pressure to such an extent as to render it incapable of overcoming the spring $j$, whereby the valves J are intended to be supported in an elevated position. As here shown, this valve K consists of a disk mounted upon a rod $k$, so that it may cover or uncover ports $k'$, extending through one side of the cross-head B. The rod $k$ is supported in a bearing in the side of the cross-head and in another bearing formed in a lug $k^2$, extending downwardly into the interior of the cross-head. A spring $k^3$, surrounding the rod $k$ between the valve K and the lug $k^2$, tends to force and hold the valve K to its seat. The rod $k$ extends some distance beyond the cross-head and on the rising of the cross-head will be forced inward by contacting with a stationary cam-surface $k^4$, supported by any fixed part of the machine—as, for instance, one of the side frames. Its inward movement will remove the valve from its seat and allow the escape of air through the ports $k'$. On the descent of the cross-head the valve will be allowed to return to its seat under the influence of the spring $k^3$.

In Figs. 3 and 4 the section $a^2$ or clearer of each of the cutters, shapers, or formers A has a rod extending upwardly from its center not only into but through the cross-head $B^{10}$. A valve J is combined with each rod $a^5$ and is made of annular form to surround such rod. A pin $a^6$ extends upward from the section $a^2$ or clearer of each cutter, shaper, or former and extends through the bottom of the cross-head $B^{10}$, so that it may contact with the adjacent valve J. Above each rod $a^5$ a bonnet B' is mounted upon the cross-head $B^{10}$. Such bonnet may be secured in place by screws passing through lugs with which it is provided and entering tapped holes in the top of the cross-head. Each bonnet B' contains a spring $F^{10}$ of helical form, bearing at one end against a collar $a^7$, fitted to the rod $a^5$, and at the other end against a plate $a^8$, arranged in the upper part of the bonnet and combined with a screw $a^9$, which passes through the top of the bonnet, engaging with a tapped hole therein and impinging upon such plate. By manipulating the screw $a^9$ the force of the spring $F^{10}$ will be varied. Each collar $a^7$ is made in the form of a nut and engages with a screw-threaded portion of the rod $a^5$, thus forming an adjustable stop, limiting the downward movement of the section $a^2$ or clearer of each cutter, shaper, or former. This form of my improvement affords provision for adjusting a spring for the section $a^2$ or clearer of each cutter, shaper, or former independently. The stripper-plate C' in this example of my improvement operates by gravity to return to its position on the dough after the cross-head begins to rise. Pins c' extend from it upwardly through a portion of the cross-head, their upper ends being provided with heads forming stops, limiting the independent upward movement of the cross-head relatively to the stripper-plate. In other respects this example of my improvement is substantially like the one first described in respect to its operation, as well as its construction.

I am unwilling to be restricted to details of construction. Obviously it would be possible to use any equivalent for the springs F $F^{10}$—as, for instance, it might be practical to suitably weight the stripper-plate C and the sections $a^2$ or clearers of the cutters, shapers, or formers as a substitute for the springs. The section $a^2$ or clearer of each cutter, shaper, or former will generally be corrugated on its under side, or, in other words, will be ornamented in intaglio or cameo.

What I claim as my invention, and desire to secure by Letters Patent, is—

1. In a machine for shaping plastic material, the combination of a reciprocating cross-head or carrier, a cutter, shaper, or former composed of two sections, one of which cuts or defines the circumference of the articles to be shaped and is attached to said cross-head or carrier and the second section or clearer of which is movable independently of the cross-head or carrier, a stripper-plate operating independently of the main section of the cutter, shaper, or former and correspondingly to the second section or clearer of the cutter, shaper, or former, the said cross-head being provided with a chamber for air or other gas communicating with the cutter, shaper, or former, a valve controlling the communication of these parts, and a pin, whereby said valve will be forcibly opened, substantially as specified.

2. In a machine for shaping plastic material, the combination of a reciprocating cross-head or carrier, a cutter, shaper, or former composed of two sections, one of which cuts or defines the circumference of the articles to be shaped and is attached to said cross-head or carrier and the second section or clearer of which is movable independently of the cross-head or carrier, a stripper-plate operating independently of the main section of the cutter, shaper, or former and correspondingly to the second section or clearer of the cutter, shaper, or former, the said cross-head or carrier being provided with a chamber for air or other gas communicating with the cutter, shaper, or former, a valve controlling the communication of these parts, a pin whereby said valve will be forcibly opened, and a relief-valve which on the rising of the cross-head or carrier will be opened to reduce the pressure of gas in said chamber, substantially as specified.

In testimony whereof I have signed my name to this specification in the presence of two subscribing witnesses.

EDMUND JORDAN.

Witnesses:
 FRANK J. SCHENCK,
 JOE BLANK.